SUPERCONDUCTING OSCILLATOR OR INVERTER

Filed Sept. 16, 1968

INVENTOR
DONALD J. HANRAHAN
BY [signature]
ATTORNEY 3,538,457

SUPERCONDUCTING OSCILLATOR OR INVERTER

Donald J. Hanrahan, Falls Church, Va., assignor to the United States of America as represented by the Secretary of the Navy Filed Sept. 16, 1968, Ser. No. 760,043
Int. Cl. H03k 3/38
U.S. Cl. 331—107 6 Claims

ABSTRACT OF THE DISCLOSURE

A superconducting astable multivibrator wherein two cryotron devices are used as the switching elements therein. The gate winding of each cryotron is alternately rendered superconductive by the current passing through their respective control windings which is approximately sinusoidally varied by an L-C-R underdamped oscillating circuit.

The invention described herein may be manufactured and used by or for the Government of the United States of America for governmental purposes without the payment of any royalties thereon or therefor.

The present invention relates generally to improvements in multivibrator oscillators and the like and more particularly to a new and improved superconductive astable multivibrator wherein low voltage inversion of the direct current output of devices such as fuel cells, solar cells, and the like is made practical.

Oscillators capable of low signal voltage and low noise operation have been found to be extremely useful in the design of maser and laser devices. In addition, where an alternating current power source is required and the only available power is from fuel cells and the like, the low voltage direct current output from the fuel cells must be converted to alternating current by an inverter circuit having a very low power drain. These requirements have drawn researchers to experiment with oscillating devices which use superconducting elements rather than vacuum tubes or semiconductors to thereby provide improved efficiency.

Superconductivity is a term used to describe the phenomenon of the absence of electrical resistance in certain materials when cooled below predetermined extremely low temperatures. The cryotron is one device which is based on this phenomenon and has been used extensively in the design of amplifiers, oscillators and various other computer logic circuits. For a more detailed discussion of exemplary circuits using cryotrons, see "The Cryotron, a Superconductive Computer Component" by D. A. Buck, published in the Proceedings of the IRE, vol. 4, No. 4, April 1956 at pages 482–493.

Briefly, the cryotron comprises at least two windings; i.e., a gate winding and a control winding. The resistance of the gate winding is dependent upon whether it is superconducting or not, which in turn is controlled by the magnetic field generated by the control winding. The gate winding is operated at a sufficiently low temperature such that it ordinarily is in the superconductive state; i.e., it ordinarily exhibits zero electrical resistance to the flow of electric current. A quiescent magnetic field, established by either a permanent magnet or an electromagnet around the gate winding, allows a small increase in the magnetic field generated by the control winding to destroy the superconductivity of the gate winding which will then exhibit its normal resistance. The fact that the gate winding is capable of being switched rapidly between a zero resistance and an appreciable resistance makes this device very desirable for power switching applications.

Two prior art oscillating circuits utilizing cryotron devices are shown and described in U.S. Pats. Nos. 2,725,474 to Ericsson et al., and 3,202,833 to Bertuch et al. Although such devices have served the purpose of providing oscillations with superconductors, they have not proved entirely satisfactory under all conditions of service especially where low voltage DC to AC inversion is desired. As will become clear as the present device is described more fully below, the current flowing from the fuel cell through the load impedance passes primarily through the gate winding to ground thereby providing a very small voltage loss. In the circuits of both patents, however, it can be seen that the current flowing through the load must also pass through the control windings of the cryotrons before being returned to ground which introduces a significant voltage drop. Normally, such a voltage drop is not critical; however, in submarine and space satellite applications these losses can mean the difference between efficient and intelligible communication with other vehicles and ground stations, and failure. Furthermore, many of these vehicles depend upon a small but stable power supply for operation of their navigation systems, and here again a small voltage drop can cause inefficient performance.

The general purpose of this invention is to provide a superconductive astable multivibrator which attains all the advantages of similarly employed prior art oscillators and possesses none of the aforedescribed disadvantages.

To attain this, the present invention contemplates a unique multivibrator circuit having primarily only superconductive switching elements in series with the output load impedance and having the frequency of oscillation accurately determined by an underdamped inductance-capacitance-resistance tuned circuit.

Accordingly, one object of the present invention is the provision of a superconductive astable multivibrator.

Another object is to provide a stable superconductive oscillator having general utility for low noise applications.

A further object of the invention is the provision of a low voltage DC to AC inverter.

Still another object is to provide an efficient power supply inverter for use with fuel cells and the like.

The principles of the invention together with additional objects thereof will become more fully apparent from the following description of an illustrative embodiment and from the drawings in which.

Figure 1:
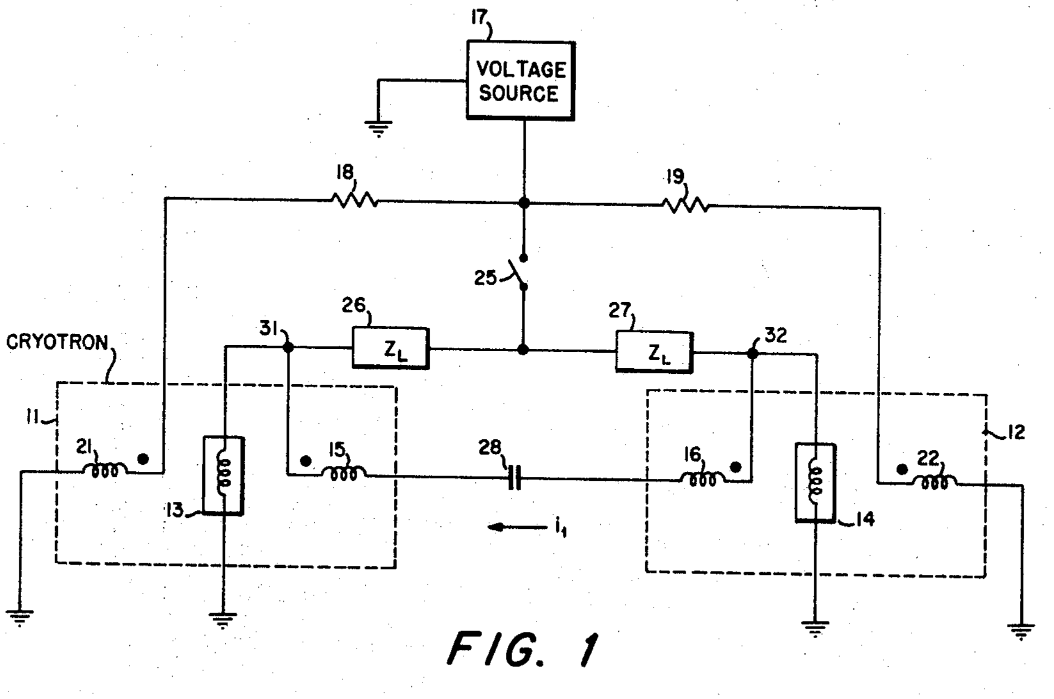
FIG. 1 is a schematic diagram of the superconductive astable multivibrator circuit of the invention.

Referring more specifically to the drawings, there is shown in FIG. 1 two cryotron devices 11 and 12 each having gate windings 13 and 14 and control windings 15 and 16. A positive DC voltage source 17 is connected through resistors 18 and 19 to quiescent field windings 21 and 22. As indicated by the dots adjacent to one end of windings 21 and 22, these windings produce a positive magnetic field when current flows from the source through the windings to ground.

Figure 2:
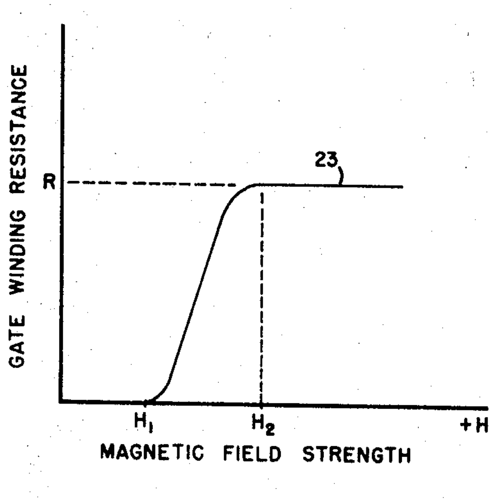
FIG. 2 is a curve which illustrates the dependence of gate winding resistance on magnetic field strength at a fixed temperature.
Figure 3:
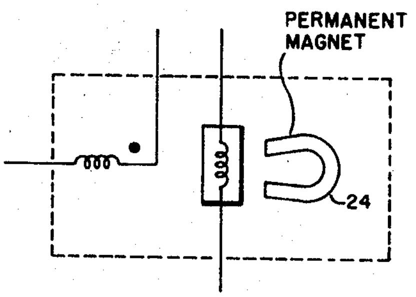
FIG. 3 is a schematic diagram of a second type of cryotron to be used in the circuit of FIG. 1.

Referring briefly to FIG. 2, there is shown a curve 23 which represents the dependency of the resistance of the gate windings upon the magnetic field strength around the windings. The gate windings are normally operated at a temperature which maintains the gate in a superconducting state such that it exhibits near-zero resistance in the absence of a magnetic field having a field strength greater than $H_1$. The quiescent magnetic field $H_1$ is generated by windings 21 and 22 which thereby enables rapid transition of the gate winding out of the superconductive state when the magnetic field strength is increased slightly to point $H_2$. The gate winding then exhibits resistance R to the flow of electrical current. The quiescent field $H_1$ generated by the windings 21 and 22 can also be provided by a permanent magnet 24 as shown in FIG. 3. This is a more efficient embodiment since no power from source 17 is needed to maintain the field.

Continuing with FIG. 1, there is shown a switch 25 which connects the voltage source 17 to one end of load impedances 26 and 27. The load impedances may be resistors, when the circuit is to be used as a low noise oscillator, or transformers, when it is to be used as an inverter. The other end of impedance 26 is returned to ground through gate winding 13 and is also connected to the dotted end of control winding 15. In similar fashion, the other end of impedance 27 is returned to ground through gate winding 14 and is also connected to the dotted end of control winding 16. The other ends of control windings 15 and 16 are connected to the respective ends of capacitor 28 which completes the circuit.

The operation of the circuit will now be described. Initially when switch 25 is closed, there will be a slight imbalance in the circuit. For example, the voltage at point 31 may be slightly less than that appearing at point 32. This potential difference will cause a current $i_1$ to flow from point 32 to point 31 through capacitor 28 in the direction shown in FIG. 1. This current enters the dotted end of control winding 16 of cryotron 12 causing a magnetic field to be generated which adds to the quiescent magnetic field generated by either winding 22 or permanent magnet 24 thereby rendering gate winding 14 nonsuperconducting, having a resistance R as seen in FIG. 2. Current $i_1$ also enters the nondotted end of control winding 15 of cryotron 11 thereby setting up a magnetic field which opposes the quiescent magnetic field allowing the gate winding 13 to become superconductive whereupon its electrical resistance becomes practically zero. When gate 13 is superconductive, point 31 is effectively connected to ground which further increases the potential difference between points 31 and 32 and insures that cryotron 11 will be maintained "on" or superconductive while cryotron 12 is maintained "off" or nonsuperconductive.

At this same time, it can be seen that current $i_1$ charges capacitor 28 which is part of an inductance-capacitance-resistance tuned circuit which further includes windings 15 and 16 and load impedances 26 and 27. The values of the components in the tuned circuit are chosen so that the circuit is underdamped and oscillates at any desired frequency according to the following formula:

$$f_1 \approx \frac{1}{2\pi}\sqrt{\frac{1}{2LC}-\left(\frac{R_L}{4_L}\right)^2}$$

where L=the inductance of each of the control windings 15 and 16, C=the capacitance of capacitor 28, and $R_L$=the resistance of each of the load impedances 26 and 27 for a resistive load. It is noted that the above formula applies to the circuit using the permanent magnet cryotron and also to the circuit (as shown in FIG. 1) using the inductive quiescent field winding where the value of resistors 18 and 19 is high.

As is well known, an LCR tuned circuit oscillates due to the alternate storage of power in the inductive and then the capacitive elements. As the power stored in one element shifts to the other element, the current flow through the circuit reverses. Thus the current flow, in the steady state, of an underdamped LCR circuit alternately switches from one direction to the other sinusoidally.

Referring again to FIG. 1, it can be seen that after a certain period of time, the current flowing in the direction shown will fully charge the capacitor 28 and will then reverse its direction so as to begin charging the inductive control windings 15 and 16. When the current changes direction, the polarity of the respective magnetic fields generated by control windings 15 and 16 changes so that the field strength of the field generated around gate 13 of cryotron 11 increases while that around gate 14 of cryotron 12 decreases. As shown in FIG. 2, this will cause cryotron 11 to turn "off" when the field strength reaches $H_2$ and will cause cryotron 12 to turn "on" as the field strength drops below that point. Thus, the gate windings are cyclically switched between the superconductive and nonsuperconductive states at frequency $f_1$ determined by the magnitude of the inductive windings 15 and 16, the load impedances 26 and 27 and the capacitor 28, as described above.

In summary, there is shown a circuit which performs DC to AC inversion with low voltage drop and is therefore suitable for use with fuel cells, solar cells and other direct conversion sources.

Furthermore, the circuit shown and described above is simple, reliable, and readily adaptable to submarine, space satellite and other similar applications.

In addition, the invention is useful as a general purpose oscillator in low noise, low signal voltage maser and laser systems.

It should be understood, of course, that the foregoing disclosure relates to only a preferred embodiment of the invention and that numerous modifications or alterations may be made therein without departing from the spirit and the scope of the invention as set forth in the appended claims.

Having thus described the invention, what is claimed is:

1. A superconductive astable multivibrator comprising:
first and second cryotron devices each having a gate winding and first and second control windings;
a source of DC potential;
first and second resistors;
means connecting said first resistor in series with the first control winding of said first cryotron device to form a first series network;
means connecting said second resistor in series with the first control winding of said second cryotron device to form a second series network;
first and second load impedances;
means connecting said first load impedance in series with the gate winding of said first cryotron device to form a third series network;
means connecting said second load impedance in series with the gate winding of said second cryotron device to form a fourth series network;
means connecting said first, second, third, and fourth series networks in parallel between said source of DC potential and ground;
a capacitor connected between said second control windings of said first and second cryotron devices to form a fifth series network;
means connecting one end of said fifth series network to the junction of said first load impedance and the gate winding of said first cryotron device; and
means connecting the other end of said first series network to the junction of said second load impedance and the gate winding of said second cryotron device;
whereby current from said source flows through the gate winding of said first cryotron device and then the gate winding of said second cryotron device, alternately, at a frequency determined primarily by the magnitude of said capacitor, said second windings, and said load impedances.

2. A superconductive astable multivibrator comprising:
first and second cryotron devices each including:
(1) a gate winding having a negligible resistance when in a superconducting state and an appreciable resistance when in a non-superconducting state, (2) means for establishing a quiescent magnetic field around said gate winding, and (3) control winding means, having two terminals, for establishing a magnetic field around said gate winding which aids said quiescent magnetic field when current flows through said control winding from one of said terminals to the other to thereby prevent the gate winding from becoming superconductive, and which opposes said quiescent magnetic field when current flows through said control winding from said other terminal to said one terminal to thereby enable the gate winding to become superconductive;

a source of DC potential;

first and second load impedances;

means connecting said first load impedance to the gate winding of said first cryotron device at a first junction to form a first series network;

means connecting said second load impedance to the gate winding of said second cryotron device at a second junction to form a second series network;

means connecting said first and second series networks in parallel between said source of DC potential and ground;

a capacitor connected between said other terminal of the control winding means of said first cryotron device and said other terminal of the control winding means of said second cryotron device to form a third series network;

means connecting said one terminal of the control winding means of said first cryotron device to said first junction; and means connecting said one terminal of the control winding means of said second cryotron device to said second junction;

whereby current from said source flows through said third series network in one direction and then the opposite direction, alternately, at a frequency determined primarily by the magnitude of said capacitor, said control windings, and said load impedances to thereby cyclically render the gate windings of said first and then said second cryotron devices superconductive at said frequency.

3. The device of claim 2 wherein said means for establishing a quiescent magnetic field comprises a permanent magnet.

4. The device of claim 2 wherein said means for establishing a quiescent magnetic field comprises an electromagnet.

5. A multivibrator comprising:

two cryotron devices each having a gating element and an inductive control element;

a separate inductive element for establishing a quiescent magnetic field around said gating element; and circuit means comprising a capacitor and two impedances, coupled to, and between, said inductive control elements for providing oscillations at a frequency determined by the magnitude of said capacitor, said impedance and said control elements;

whereby said gating elements are alternately rendered superconductive and then nonsuperconductive.

6. A multivibrator comprising:

two cryotron devices each having a gating element and an inductive control element;

a permanent magnet for establishing a quiescent magnetic field around said gating element; and circuit means comprising a capacitor and two impedances, coupled to, and between, said inductive control elements for providing oscillations at a frequency determined by the magnitude of said capacitor, said impedance and said control elements;

whereby said gating elements are alternately rendered superconductive and then nonsuperconductive.

References Cited

UNITED STATES PATENTS

| | | |
|---|---|---|
| 3,188,579 | 6/1965 | Meiklejohn. |
| 3,253,232 | 5/1966 | Sobol et al. |

ROY LAKE, Primary Examiner

S. H. GRIMM, Assistant Examiner

U.S. Cl. X.R.

307—277, 306; 331—144, 167; 338—32